March 10, 1970 R. L. SEELEY ETAL 3,500,131

ELECTRONIC CIRCUIT ASSEMBLY

Filed Aug. 27, 1968

INVENTORS

ROBERT L. SEELEY
ARTHUR J. SCHLOSSER

BY

ATTORNEYS

3,500,131
ELECTRONIC CIRCUIT ASSEMBLY

Robert L. Seeley and Arthur Schlasser, Jr., San Diego, Calif., assignors to the United States of America as represented by the Secretary of the Navy Filed Aug. 27, 1968, Ser. No. 755,643
Int. Cl. H02b *1/08, 1/04, 9/00*
U.S. Cl. 317—120 5 Claims

ABSTRACT OF THE DISCLOSURE

An electronic circuit assembly accommodates a plurality of electronic component mounting boards which may be of the printed circuit type. A comparatively thick-walled syntactic foam body member has its internal sidewalls grooved to receive and support the electronic component mounting boards. At the bottom of the cavity in the syntactic foam body member electrical connectors are supported upwardly, preferably in a nonconductive potting material, and are so arranged and configured to slidingly engage electrical connectors extending from the bottom of each component mounting board. Electrical conductors are connected with the electrical connectors to form an electrical path to the outside of the body and cover means is secured against the body member to exclude high pressure water environment. A relatively light and extremely strong syntactic foam type body can be dimensioned and configured to produce an aggregate buoyancy to the entire assembly of either positive, negative, or neutral nature, as desired, by selecting the sidewall thickness and/or removing a portion of syntactic foam material from the body member after its initial fabrication and assembly.

The invention described herein may be manufactured and used by or for the Government of the United States of America for governmental purposes without the payment of any royalties thereon or therefor.

CROSS-REFERENCE TO RELATED APPLICATION

Certain aspects of the present invention are broadly related to the teaching and disclosure of a co-pending patent application S.N. 605,516, filed Dec. 22, 1966 in the name of Arthur J. Schlosser and Robert L. Seeley, entitled "Deep Submersible Instrumentation Package Assembly."

BACKGROUND OF THE INVENTION

Deep submergence oceanographic exploration is a relatively new field of investigation. Because the capabilities of vessels and vehicles to operate at greater and greater depths, the demands for instrumentation packaging techniques, etc. are constantly changing due in large measure to the severe environmental conditions found at great depths such as 4,000 feet and more. Prior art packaging of electronic circuitry and instrumentation has generally employed conventional stainless steel, bronze, or other types of metals which resist corrosion and will withstand great pressure. These materials, however, have their disadvantages, and one of the most troublesome is a relatively great weight which adds to the overall weight of the deep submergence vessel and may interfere with or deteriorate the operational efficiency of the deep submergence vessel. Moreover, such materials, while they are relatively corrosion-resistant, are not completely impervious to the corrosive effects of salt water, for example. Also, when metals such as bronze or stainless steel are employed for the packaging of electronic circuitry, there is an inherent problem of insulation because of the conductivity of these metals. Those skilled in the art of deep submergence oceanographic exploration will be aware that it is customary wherever possible to mount electronics circuits, instrumentation, etc. on the outside of the deep submergence vessels because of the very limited space within. This immediately poses two problems with conventional prior art packaging techniques. One is, that the weight of the externally mounted electronic circuits, instrumentation, etc. effect the buoyancy, operational efficiency, and maneuverability of the deep submergence vessel. A second concomitant problem is that when such deep submergence vessel is involved in a dive, any instrumentation or electronic circuitry package which is dislodged from its external mounting is usually lost beyond recovery.

SUMMARY OF THE INVENTION

The present invention contemplates an electronic circuit assembly which comprises a syntactic foam type body having a hollow cavity formed by opposed sidewalls. The interior cavity may be rectangular or cylindrical in shape and lengthwise grooves are formed in the relatively thick-walled body so as to receive and support electronic component mounting boards. Appropriate conductive means connect the electronic components on each mounting board, terminating in electrical connectors which extend from the bottom edge of each mounting board. Supported upwardly from the bottom of the hollow cavity within the thick-walled body member are matching connectors, positioned and configured for sliding engagement with the electrical connectors extending from the bottom edges of the mounting boards. Appropriate electrical conductors are connected to the matching electrical connectors and adapted to form electrical paths communicating with the outside of the thick-walled body member. A cover means for excluding deep submergency high pressure water from the hollow cavity is provided and secured in pressure-tight contact with the body member.

The syntactic foam type body member may be either machined from a solid block, bonded together by epoxy or other suitable means to form a hollow member, or it may be cast in a desired shape. Since the syntactic foam type material is nonconductive, it poses no problem of insulation as do the prior art metallic assemblies of like function. Additionally, the facility with which syntactic foam type material may be machined, expedites the forming of grooves in the interior sidewalls of the body member to receive and support electronic component mounting boards such as printed circuits, for example.

Moreover, if a cylindrical interior cavity is cast or machined in the syntactic foam type body member, the opposed pairs of grooves formed in the sidewalls can be made to accommodate different widths of electronic component mounting boards. In a preferred embodiment of the present invention an appropriate nonconductive potting material is preferably employed to support the matching electrical connectors which are mounted in the bottom of the cavity and extend upwardly to receive and engage the connectors extending from the component mounting boards. Accordingly, when the mounting boards are slidingly positioned in opposed pairs of grooves and slidingly engage pairs of connectors, the mounting boards are securely supported as well as making excellent positive electrical contact. Moreover, due to the concept of the present invention, the circuit boards may be readily removed for test, repair, replacement, or modification as desired.

The primary object of the present invention is to provide an improved electronic circuit assembly for use in severe environmental conditions found in deep submergence oceanography exploration.

Another object of the present invention is to provide such an electronic circuit assembly which is not subject to the deteriorating effects of corrosive environment such as ocean salt water and at the same time may be readily fabricated of relatively inexpensive material.

Another object of the present invention is to provide such an electronic circuit assembly which can be designed to have positive, negative, or neutral buoyancy, as desired, by calculating the aggregate buoyancy of the entire assembly including the normally buoyant syntactic foam portions.

Another object of the present invention is to provide an electronic circuit assembly in which a relatively thick-walled syntactic foam body member is adapted to have a portion of such syntactic foam type material removed to effect desired changes or adjustment in buoyancy.

Another object of the present invention is to provide an electronic circuit assembly which affords ruggedized support for electronic component mounting means, can withstand severe pressures at great ocean depths, and is self-recovering in the event that it is dislodged from the external mounting on a deep submergence vehicle.

These and other advantages features and objects of the present invention will be better understood from the following description of several preferred embodiments which are illustrated in the accompanying drawings.

BRIEF DESCRIPTION OF THE DRAWING

In the drawings:

In FIG. 1 there is illustrated a preferred form of the present invention which comprises a body member 10 preferably of syntactic foam type material. Such material is comprised of hollow spheres which may be made of glass and bonded together by an appropriate plastic material such as epoxy to give the appearance and many qualities of a solid material. Syntactic foam types of material are relatively highly buoyant as compared to metals and other materials customarily employed in deep submergence exploration for protecting electronic circuits. Moreover, it can be readily machined, may be cast into special forms and configurations, as desired, is noncorrosive, and withstands extremely high pressures such as are encountered at depths of 5,000 feet and more.

Figure 1:
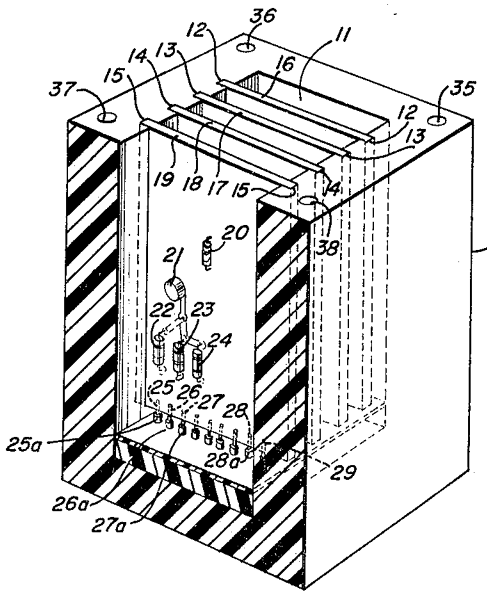
FIG. 1 is a partially cutaway, perspective view of an embodiment of the present invention.

The syntactic foam body member 10 as illustrated in FIG. 1 has a hollow cavity 11 which in the illustration of the embodiment of FIG. 1 takes a rectangular cross-sectional form. Thus, the hollow cavity 11 forms opposed sidewalls and pairs of opposed grooves 12, 13, 14, and 15 are formed in the interior cavity 11 of the body member 10. Each pair of opposed grooves such as 12, 13, 14, and 15, is configured to receive and support an electronic component mounting board such as are shown at 16, 17, 18, and 19.

Each of the mounting boards 16, 17, 18, and 19 is provided with conductive means which connect the electronic components such as those illustrated at 20, 21, 22, 23, and 24 on the mounting board 19. These components may take form of semiconductor devices such as transistors, diodes, resistors, capacitors, relays, transformers, etc. The conductive means for connecting the components may comprise a typical printed circuit configured and fabricated in a number of ways well known in the art. The conductive means such as a printed circuit is terminated in a plurality of electrical connectors extending from the bottom of the mounting boards such as the electrical connectors 25, 26, 27, 28, and 29 shown extending from the bottom of the mounting board 19.

Matching electrical connectors **25*a*, 26*a*, 27*a*, 28*a*, and 29*a* are supported upwardly from the bottom of the hollow cavity 11 within the body member 10 and are positioned and configured for slidingly engaging the electrical connectors 25, 26, 27, 28, and 29 extending from the bottom edge of the mounting board 19. The connectors 25*a*, 26*a*, 27*a*, 28*a*, and 29*a* are preferably supported by being potted in an appropriate nonconductive material such as a thermo-setting resin, for example. Arranged within the potted material are a plurality of electrical conductors connected to the matching connectors 25*a*, 26*a*, 27*a*, 28*a*, and 29*a* to form a plurality of electrical paths connectable to the outside of the body member 10 and the entire electronic circuit assembly. These electrical conductors may be seen more clearly as illustrated at 30** in FIG. 2.

Figure 2:
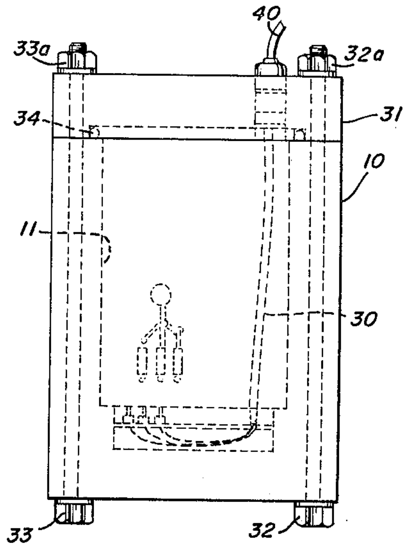
FIG. 2 is an end view of the embodiment of FIG. 1.

As shown in FIG. 2, a cover member 31 is provided for excluding the deep submergence high pressure water from the hollow cavity 11 of the body member 10. The cover member 31 is secured in pressure-proof contact with the body member 10 by means of a plurality of elongate bolts as shown at 32 and 33 in FIG. 2, secured with matching nuts **32*a* and 33*a*. An O ring 34 is partially recessed in the cover member 31 so as to provide the pressureproof seal between the cover member 31 and the body member 10**.

Several different securing means may be employed; however, it has been found preferable to use through bolts such as those illustrated at 32 and 33 so that the extremely high pressures encountered in deep submergence oceanography exploration do not exert undue stresses in partial cavities; that is to say, that the holes 35, 36, 37, and 38 in the body member 10 which receive the through bolts 32 and 33, in effect, become free-flooding under extremely high pressure conditions. Thus, any undue stresses upon the syntactic foam material such as pressure differentials which may tend to cause cracking or weakening of that material are obviated.

The plurality of electrical conductors 30 are connected to a terminal means 39 which is sealed into the cover member and affords a communication through the conduit 40 to the outside of the electronic circuit assembly. Accordingly, appropriate connection may be made, as desired, by conventional waterproof and pressureproof multiple connectors.

Figure 3:
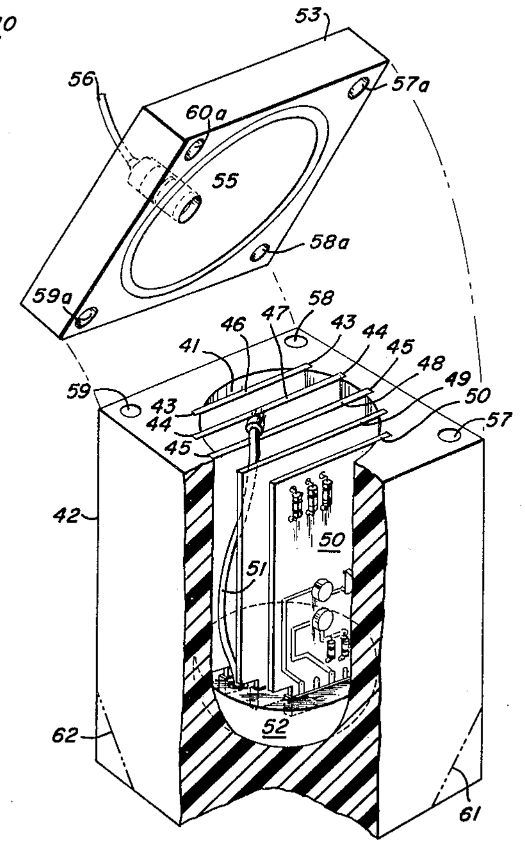
FIG. 3 is a partially cutaway, perspective view of a variant form of preferred embodiment of the present invention.

FIG. 3 illustrates a variant preferred embodiment of the present invention wherein the hollow cavity 41 which is machined or cast into the syntactic foam body member 42, is substantially of cylindrical form. In the embodiment of FIG. 3, multiple pairs of opposed grooves 43, 44, and 45 are formed in the sidewalls of the cylindrical cavity 41. As in the previously described embodiment of FIGS. 1 and 2, the embodiment of FIG. 3 employs pairs of opposed grooves which are configured to receive and support electronic component boards 46, 47, 48, 49, and 50.

One advantage of the particular configuration illustrated in FIG. 3 is that the syntactic foam type body member 42 may have the cylindrically shaped cavity 41 readily machined out of a solid block of syntactic foam type material by the use of conventional tools. Additionally, the opposed pairs of grooves 43, 44, and 45 will accommodate different widths of component mounting boards which may be highly desirable in specific applications.

The mounting boards 46, 47, 48, 49, and 50 are provided with appropriate electrical conductive means which connect the electronic components mounted thereon. The embodiment illustrated in FIG. 3 also has component mounting boards which are provided with a plurality of electrical connectors extending from the bottom of each of the mounting boards 46, 47, 38, 49, and 50 in the manner illustrated by FIGS. 1 and 2. Also in like manner, matching connectors extend upwardly from the bottom of the cylindrical cavity 41 and are positioned to slidingly engage the electrical connectors extending from the bottom edges of the mounting boards. These supporting and connecting matching electrical connectors are connected, in turn, wtih the plurality of suitable electrical conductors which terminate in a multiple connector as shown at 51.

The upwardly extending matching electrical connectors are preferably potted in the bottom of the cylindrical cavity 41 as illustrated at 52. The potting material being of a nonconductive type such as an appropriate firmly thermosetting resin. A cover member 53 is provided to protect the interior cavity 41 electronic assembly from the high pressure water environment. An appropriate O ring means is partially recessed in a groove 54 of the cover member 53 to provide a pressure-proof seal between the body member 42 and the cover member 53. A matching multiple connector 55 is provided in the cover means 53 to be connected to the multiple connector 51 and provide the plurality of conductive paths to the exterior of the assembly through the conduit 56. The body member 52 is provided with a plurality of through holes 57, 58, and 59 which match with the holes 57*a*, 58*a*, 59*a*, and 60*a* to receive through-bolts such as those illustrated in FIG. 1 for maintaining the cover member 53 in pressure-proof sealed contact with body member 52.

The present invention has the advantages of providing secure and rigid support for electronic circuit components which are protected against high pressure water environments. Through the use of syntactic foam material for the cover member and body member of the assembly, the entire assembly is noncorrosive and virtually impervious to the deleterious effects of deep submergence salt water environments.

Moreover, the syntactic foam material has the advantages of withstanding extreme pressures, being readily machineable, and in addition, being of itself positively buoyant. Accordingly, the entire assembly may be rendered negatively, positively, or neutrally buoyant as desired.

The entire assembly may be made to have a desired aggregate buoyancy by fabricating the assembly, including the internal component mounting boards, potting material, conductors, connectors, and securing means (such as the bolts) by making final adjustment to the aggregate buoyancy after the entire assembly has been fabricated, assembled, and completed. This may be readily accomplished by the use of ordinary hand tools by removing small amounts of syntactic foam material from corners of the body member such as indicated by the "dash" lines 61 and 62 of FIG. 3. In accordance with the teaching of the present invention, after the entire assembly including the component mounting boards, connectors, conductors, terminals, etc. have been assembled, the assembly may be tested for its aggregate buoyancy and such buoyancy adjusted to the desired degree by the technique described hereinbefore. In this regard it would be apparent, of course, that it is highly desirable to make an initial calculation as to buoyancy providing for some reasonable degree of positive buoyancy which will be susceptible to reducing the positive buoyancy to the desired degree of positive buoyancy, neutral buoyancy, or negative buoyancy by the removal of excess portions of syntactic type foam material from portions of the body member, for example, where the strength and purpose of the body member will not be impaired. In this manner, within the teaching of the present invention, the entire electronic circuit assembly may be made to have a desirable degree of positive buoyancy thereby becoming self-recovering in the event that the electronic circuit assembly is dislodged from its normal mounting on the exterior of a deep submergence vehicle. Thus, one of the problems and disadvantages of prior art deep submergence electronic circuit assemblies is avoided and the electronic circuit assembly of the present invention provides against the loss of the electronic circuit assembly by reason of its sinking to the bottom upon becoming inadvertently dislodged from its normal mounting position on the external portions of a deep submergence vehicle or vessel.

Obviously many modifications and variations of the present invention are possible in the light of the above teachings. It is, therefore, to be understood that within the scope of the appended claims the invention may be practiced otherwise than as specifically described.

What is claimed is:

1. An electronic circuit assembly comprising:

a syntactic foam body having a hollow cavity therein forming opposed sidewalls;

pairs of opposed grooves formed in said sidewalls, each of said pair of opposed grooves being configured to receive and support an electronic component mounting board;

a conductive means connecting electronic components on each said mounting board and terminating in electrical connectors extending from the bottom edge of each said mounting board;

matching electrical connectors supported upwardly from the bottom of said hollow cavity within said body, said matching connectors being positioned and configured for slidingly engaging the electrical connectors extending from the bottom edges of said mounting boards;

electrical conductors connected to said matching electrical connectors and forming electrical paths to the outside of said body;

cover means for excluding deep submergence, high pressure water from said hollow cavity; and means for securing said cover means in pressure-proof contact with said body member.

2. An electronic circuit assembly as claimed in claim 1 wherein the aggregate buoyancy of said assembly is predetermined to be positive, negative, or neutral as desired by selecting the sidewall thickness of said body member.

3. An electronic circuit assembly as claimed in claim 2 wherein said mounting boards include printed circuits.

4. An electronic circuit assembly as claimed in claim 2 wherein said matching electrical connectors are potted in nonconductive material in the bottom of said hollow cavity.

5. An electrical circuit assembly as claimed in claim 2 wherein said hollow cavity is cylindrical to accommodate different widths of component mounting boards.

References Cited

UNITED STATES PATENTS 3,368,115 2/1968 Hoffman ---------- 317—101

LEWIS H. MYERS, Primary Examiner

GERALD P. TOLIN, Assistant Examiner

U.S. Cl. X.R.

174—52; 317—101